Jan. 1, 1935.  G. P. THIELE  1,986,688
GOGGLES
Filed Sept. 25, 1933   2 Sheets-Sheet 1
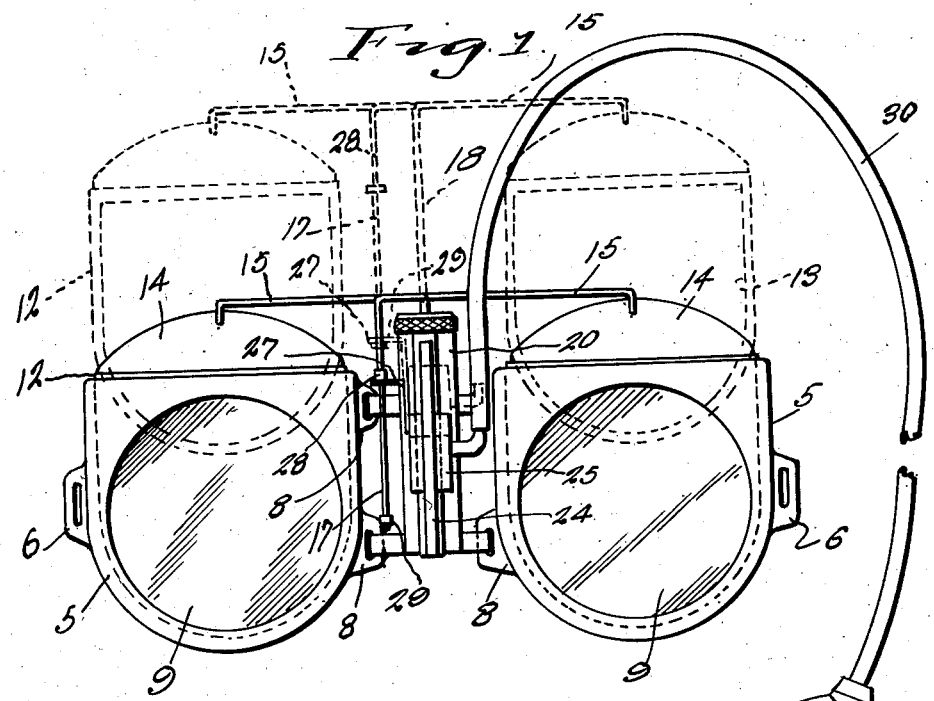
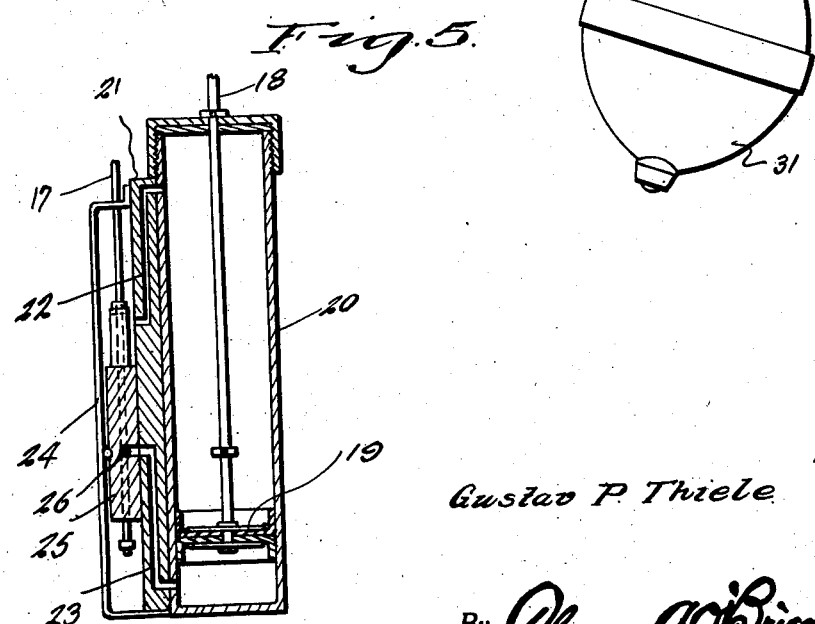
Inventor
Gustav P. Thiele
By Clarence A. O'Brien
Attorney Jan. 1, 1935. G. P. THIELE 1,986,688
GOGGLES
Filed Sept. 25, 1933  2 Sheets-Sheet 2
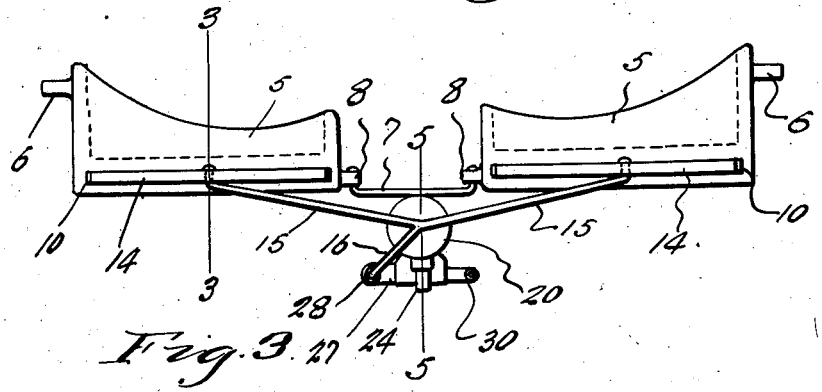
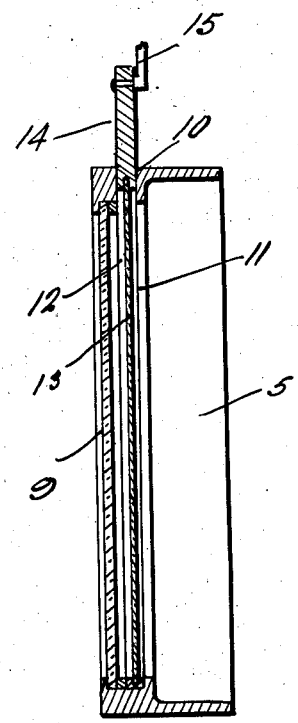
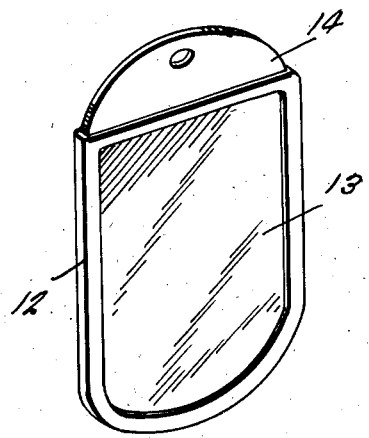
Inventor
Gustav P. Thiele
By Clarence A. O'Brien
Attorney Patented Jan. 1, 1935

1,986,688

UNITED STATES PATENT OFFICE 1,986,688

GOGGLES

Gustav Paul Thiele, Bedford, Ohio

Application September 25, 1933, Serial No. 690,893

4 Claims. (Cl. 2—14)

This invention relates to goggles, and more particularly to goggles of the type used by persons engaged in welding as a protection for the eyes.

The main objection to goggles now generally used for this purpose is that the repairman is constantly required to raise the goggles to a position across the forehead above the eyes when performing certain operations, as for example, placing the work in the jig, reaching for the torch or for the welding rod, and in the performance of many other duties thus requiring the consumption of a great deal of time.

In accordance with the present invention, goggles for the purpose above suggested are provided which when once properly positioned need not be removed or displaced for clear vision purposes, for the reason that, in accordance with the present invention, the colored lenses of the goggles may be adjusted vertically with respect to the lens frames when the welder is performing operations other than the actual welding operation.

The invention, together with its numerous objects and advantages will be best understood from a study of the following description taken in connection with the accompanying drawings wherein:

Figure 1 is a front elevational view of a pair of goggles embodying the features of the present invention, the raised adjusted position of the colored lenses being suggested by broken lines.

Figure 2 is a top plan view of the goggles.

Figures 3 and 5 are sectional views taken substantially on the lines 3—3 and 5—5 respectively of Figure 2.

Figure 4 is a perspective view of a colored lens and a slide frame therefor.

Referring to the drawings by reference numerals, it will be seen that the goggles in accordance with the present invention, comprise a pair of lens frames 5—5 which are of any suitable construction, formed of any suitable material and of any desired shape. At the outer sides thereof the frames 5 are provided with lugs or other suitable means 6 for the attachment thereto of a head strap, temples, or other devices for securing the goggles in position on the head. At the confronting sides the lens frames 5 are connected by spaced straps 7 the ends of which are suitably engaged with lugs 8 for connecting the frames together. The straps 7 provide a nose piece or bridge for the goggles. Each lens frame 5 also has suitably mounted therein a lens 9 which is of clear uncolored glass.

In accordance with the present invention, each of the frames 5 is provided with a slot 10 at the top thereof and an internal guide groove 11 extending along the sides and bottom of the frames.

Each of the lens frames 5 has associated therewith a slide frame 12 engaging the guide groove 11 and operating through the slot 10. Mounted in the frame 12 is a lens 13 which is suitably colored for protecting the eyes from glare.

The frames 12 at their upper ends are provided with extensions 14 connected rigidly in any suitable manner with the oppositely extending arms 15 provided at the angularly disposed end 16 of a rod 17.

Also connected with the arms 15 at the junction of the arms with the rod end 16 is a piston rod 18. On the lower end of the rod 18 is a piston 19 mounted for reciprocation in a cylinder 20 that is suitably secured to the bridge straps 7 for supporting the cylinder in position. It will thus be seen that reciprocatory movement of the piston 19 will be transmitted to the slides 12 for raising or lowering the slides relative to the lens frames 5.

In the present embodiment of the invention the cylinder 20 is provided on the wall thereof with a formation 21 having formed therein passages 22 and 23 that respectively open at one end into the cylinder 20, and at a relatively opposite end open to the atmosphere. It will be noted that passage 22 opens into the cylinder 20 above the piston 19, and the passage 23 opens into the cylinder below the piston.

Suitably mounted on the formation 21 is a guide frame 24 in which is mounted for reciprocation a valve member 25 having a passage 26 extending therethrough for registry with the outer ends of the passages 22 and 23. The valve member 25 has suitably secured thereto an angular bracket 27 the free horizontal arm of which is apertured to accommodate the aforementioned rod 17. The rod 17 has provided thereon above the bracket 27 a fixed collar 28, and below the bracket 27 a fixed collar 29. The collars 28 and 29 are so spaced to engage the bracket 27 just previous to the completion of a stroke by the piston 19 so that the valve 25 will remain in its set position for the major portion of the stroke of the piston 19. Obviously the space between the ports 22 and 23 and the relative positions of the collars 28 and 29 must be such that upon an upward and downward movement of the piston the passage 26 will be moved into communication with the ports 22 and 23 at the proper time.

The valve 25 has suitably connected thereto in communication with the passage 26 one end of a flexible tube 30, and on the free end of the tube 30 is a bulb 31.

It is thought that the operation and utility of the goggles will be apparent from the above description, however, it may be briefly stated that when, as for example, during actual welding operations, protection against glare is needed for the eyes, the frames 12 are in their lowermost position placing the lenses 13 in parallel alinement with the lenses 9. Under such circumstances as will not require anti-glare protection for the eyes, instead of shifting the goggles bodily upwardly across the forehead, all that is necessary for the operator to do, is to squeeze the bulb 31 for forcing air under pressure to the cylinder 20 at the underside of the piston 19 for moving the piston from its normal lower position shown in Figure 5 upwardly within the cylinder. Obviously, upon upward movement of the piston 19, movement of the piston is transmitted to the slides 12 through the medium of the piston rod 18 and arms 15 connecting the rod with the frames 12. The frames 12 and lenses 13 associated therewith are thus moved upwardly through the slots 10 in the lens frames 5 to the dotted line position shown in Figure 1, thus giving to the operator clear vision through the lenses 9 of the goggles.

As shown in Figure 5, with the piston 19 in its lowermost position, valve member 25 will also be in a lowermost position with its passage 26 registering with the passage 23 for the supply of air to the cylinder 20 below the piston 19. Now, as the piston 19 moves upwardly as and for the purpose above stated, the valve member 25 will remain in its lowermost position until the piston 19 approaches the end of its upward stroke. As the piston 19 just approaches the end of its upward stroke, rod 17 that of course moving upwardly with the piston by reason of its connection with the arms 15 will bring collar 29 thereon into engagement with the underside of the bracket 28 thus causing the valve member 25 to move upwardly as the piston 19 continues to the limit of its upward stroke. When the piston 19 is at the limit of its upward stroke, the valve 25 will have been moved up sufficiently far enough to register the passage 26 thereof with the lower or outer end of the passage 22 so that all the parts will be in the dotted line position suggested in Figure 1.

Now with the parts in the dotted line position shown in Figure 1, and it is desired to lower slides 12 and lenses 13 associated therewith for shielding the eyes, the operator squeezes the bulb 31 for supplying air to the cylinder 20 through the tube 30, passage 26 of valve 25 and passage 22. The air being thus forced into the cylinder 20 above the piston 19 will cause the piston to move downwardly resulting in a downward movement of the slide frames 12 to the full line position shown in Figure 1.

In actual practice, it will be found advantageous to the operator to secure the bulb 31 underneath the arm in any suitable manner so that a squeezing of the bulb can be readily effected by drawing the arm inwardly towards the body in a manner thought apparent, thus leaving the hands free for other work at all times.

What is claimed is:

1. A pair of goggles including in combination, lens frames, clear vision lenses mounted in the frames, an anti-glare device slidably engaged with each lens frame and normally positioned in parallelism with the clear vision lenses, and pneumatic operating means common to the anti-glare devices for simultaneously shifting them to the desired adjustment relative to the clear vision lenses.

2. A pair of goggles including in combination, lens frames, slides mounted in said frames, lenses mounted in the slides, and a pneumatic operating means connected with the slides for shifting them.

3. A pair of goggles including in combination a pair of lens frames, bridge straps connecting said frames, slide frames mounted in the lens frames, semi-transparent lenses mounted in the slides, a cylinder supported by said bridge straps, a piston mounted for reciprocation in said cylinder, an operating connection between said piston and said slides, said cylinder having passages extending through the wall thereof above and below said piston, a valve member mounted for sliding movement relative to the cylinder and having a passage to be alined with a selected one of said first named passages, guide means for said valve member, a flexible pneumatic tube attached to the valve member in communication with the passage in said valve member, and a lost motion connection between said piston and said valve member.

4. A pair of goggles including in combination lens frames, anti-glare devices slidably mounted in said frames, bridge means connecting said frames, a cylinder supported by said bridge means, a piston mounted for reciprocation in said cylinder, an operating connection between said piston and the anti-glare devices, and valve controlled pneumatic operating means connected with said cylinder for reciprocating said piston.

GUSTAV PAUL THIELE.